United States Patent [19]
Kelleher

[11] Patent Number: 4,486,875
[45] Date of Patent: Dec. 4, 1984

[54] VIDEO DISC PLAYER HAVING LIFTER DRIVING CIRCUIT

[75] Inventor: Kevin C. Kelleher, Plainfield, Ind.

[73] Assignee: RCA Corporation, New York, N.Y.

[21] Appl. No.: 478,935

[22] Filed: Mar. 25, 1983

[51] Int. Cl.³ .............................................. G11B 3/10
[52] U.S. Cl. ..................................... 369/170; 369/230
[58] Field of Search ................................. 369/170, 230

[56] References Cited

U.S. PATENT DOCUMENTS

| 4,049,280 | 9/1977 | Leedom | 369/170 |
| 4,445,210 | 4/1984 | Adachi | 369/230 |

FOREIGN PATENT DOCUMENTS 0746699  7/1980  U.S.S.R. .............................. 369/230

Primary Examiner—Steven L. Stephan
Attorney, Agent, or Firm—Paul J. Rasmussen; William H. Meise; Dilip A. Kulkarni

[57] ABSTRACT

The stylus lifter driving circuit gradually lowers the stylus arm until the stylus contacts a turntable-disposed record. Once the stylus/record engagement is detected, the lifter support bracket rapidly moves away from the stylus arm to prevent stylus bouncing.

17 Claims, 8 Drawing Figures

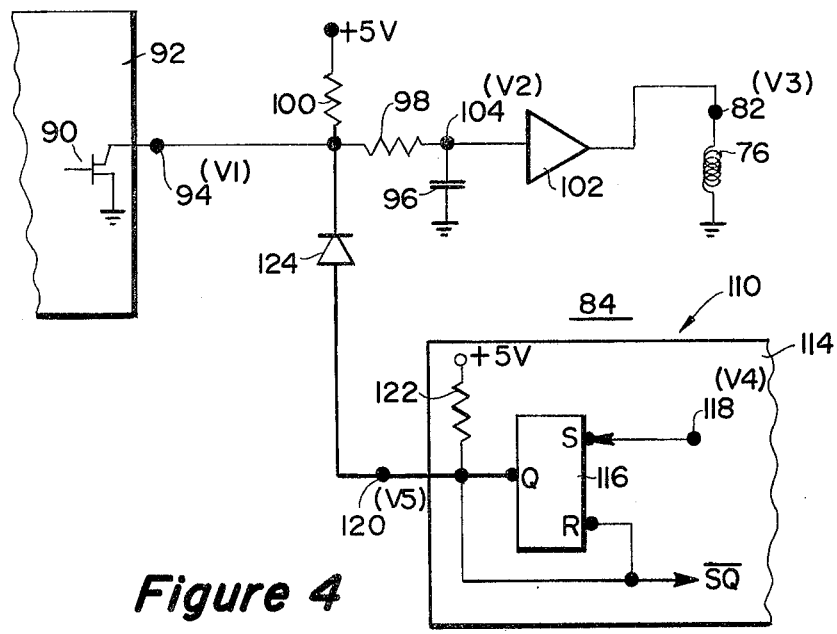
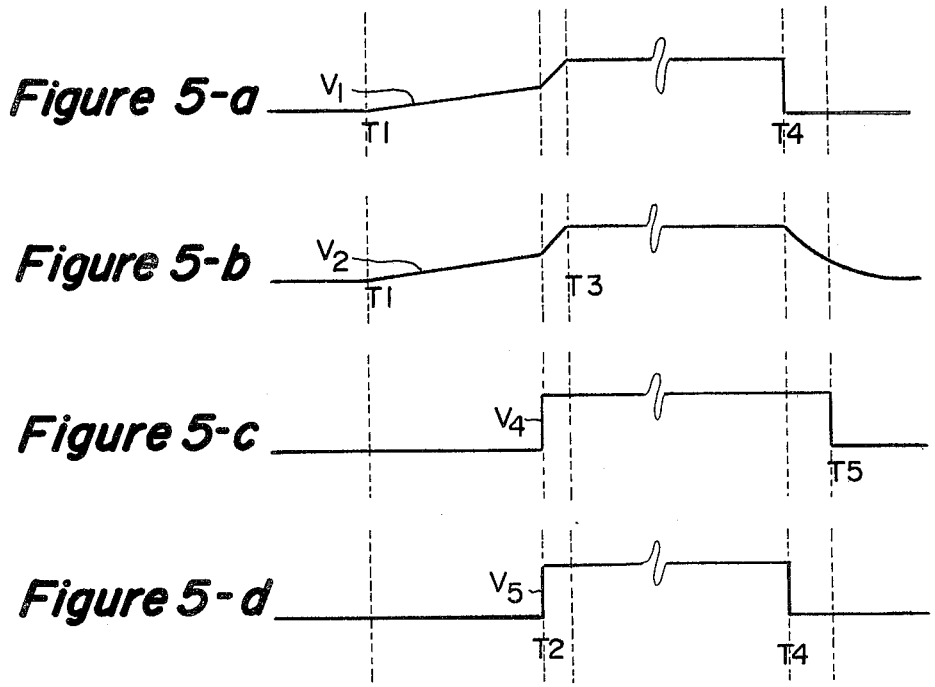

VIDEO DISC PLAYER HAVING LIFTER DRIVING CIRCUIT

The present invention relates generally to a video disc record player and, more particularly, to a stylus lifter mechanism for use therewith.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In video disc systems, the information track density is generally quite high. For example, the above-mentioned capacitance-type system uses a spirally-grooved information track with a groove density of nearly 10,000 grooves per inch (groove width=approximately 2.5 micrometers). During playback, the stylus tip is received in the groove and guided toward the record center as a turntable-supported record revolves at the desired speed (e.g., 450 rpm). The microscopic groove geometries require a stylus that has rather fine dimensions (e.g., tip width—2 micrometers).

The pickup stylus is typically housed in a protective cartridge. The stylus is disposed at one end of a stylus arm having its other end suspended in the cartridge housing by a rubber suspension. The stylus arm is held inside the cartridge housing in its stored position by a pair of retaining fingers. A leaf spring (or a flylead) has one end secured to the stylus, and its other end to the cartridge housing. The flylead provides the stylus/record engagement force, and also serves as the electrical connection between the stylus electrode and the signal processing circuits of a video disc player.

The stylus cartridge is inserted into a carriage translatably mounted in the video disc player. When the cartridge is thus installed in the carriage, the stylus arm retaining fingers are automatically spread apart to release the stylus arm. Housed in the carriage is a stylus lifting/lowering mechanism (also referred to as the stylus lifter mechanism) for selectively lowering the stylus onto a turntable-supported record. During playback, the carriage follows the radially inward motion of the groove-guided stylus.

A concern with the stylus lifter mechanism has been the potential damage to the disc when the stylus is let down onto the disc and lifted up therefrom. High density information systems of this nature require gentle lowering and lifting of the stylus in order to minimize the stylus/disc damage. U.S. Pat. No. 4,266,785 (Burrus) describes an electromagnetic stylus lifter mechanism which smoothly and reliably performs the lifting and lowering operations.

Basically, the Burrus lifter mechanism comprises a movably-mounted stylus arm support bracket, and a selectively-actuated electromagnet. The lifter electromagnet comprises an electrical winding defining a central volume which forms an air gap, and a permanent magnet attached to the stylus arm support bracket with its end extending into the central air gap. When energized, the electrical winding repels the permanent magnet out of the air gap to lower the stylus onto the record. When the voltage across the lifter winding is removed, the stylus arm support bracket automatically rises to lift the stylus away from the record. An advantage of this arrangement is that the stylus is up in the cartridge when the power is off.

To ensure smooth landing and lift-off, the voltage across the lifter electrical winding is gradually increased and decreased. The gradual increase in the solenoid force can, however, have damaging side effects. As the stylus lands on the disc, the downward motion of the stylus arm support bracket is temporarily arrested until the repulsion force on the permanent magnet builds up sufficiently to compensate for the loss of downward force exerted by the stylus arm on the support bracket. The downward stylus arm force stems from two sources—the weight of the stylus arm assembly, and the stylus leaf spring force. During this interim phase, the stylus is only partially supported by the disc, and may bounce back-and-forth between the disc and the support bracket as the portion of the disc beneath the stylus moves toward and away from the stylus due to disc surface defects, warp, etc. The stylus bouncing can damage both the disc and stylus, and can also cause stylus mistracking.

The stylus lifter driving circuit, in accordance with this invention, overcomes the above-mentioned problems. The lifter driving circuit comprises a first energizing means for gradually increasing the lifter force to gently move the stylus toward the disc until the stylus/record engagement is established. The lifter driving circuit further includes a second energizing means for rapidly increasing the lifter force to cause the stylus arm support bracket to quickly clear the stylus arm when the stylus/record contact is detected.

In the Drawings:

FIG. 4 represents the schematic diagram of the lifter driving circuit of this invention; and FIGS. 5-a through 5-d illustrate the waveforms associated with the operation of the FIG. 5 lifter driving circuit.

Figure 1:
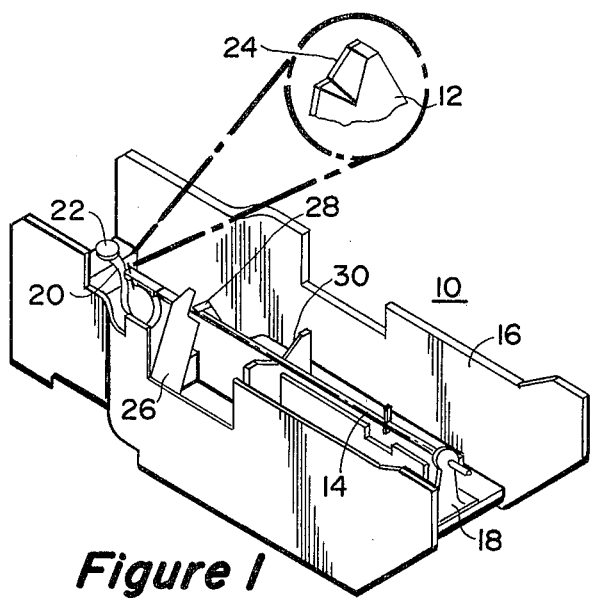
FIG. 1 is a pickup cartridge, shown upside down, suitable for use with the stylus lifter mechanism in accordance with this invention.

Shown in FIG. 1 is a pickup cartridge 10 suitable for use with the stylus lifter mechanism of the present invention. A pickup stylus 12 is disposed at one end of a stylus arm 14, with its other end suspended in the cartridge housing 16 by a compliant rubber suspension 18. A leaf spring 20, also referred to as the flylead, is connected between the stylus 12 and a metallic rivet 22 on the cartridge housing 16. The stylus flylead 20 provides an electrical connection between a stylus-mounted electrode 24 and the player pickup circuitry in the manner described later. The stylus flylead 20 additionally serves to provide stylus/record tracking force (e.g., 60 to 70 milligrams) during playback. The cartridge 10 is fitted with a pair of retaining fingers 26 and 28 to hold the stylus arm 14 in a V-shaped groove 30.

Figure 2:
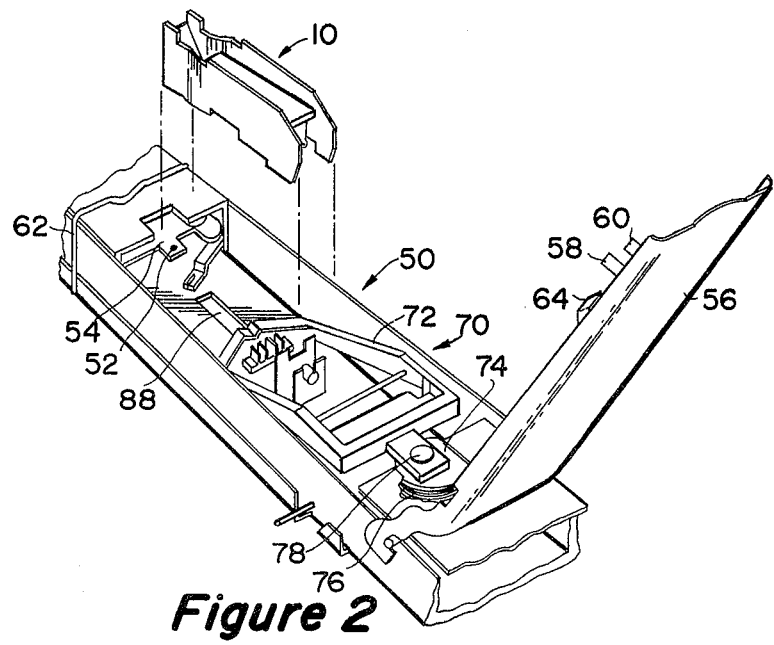
FIG. 2 shows a carriage which houses the subject stylus lifter mechanism and the FIG. 1 pickup cartridge.
Figure 3:
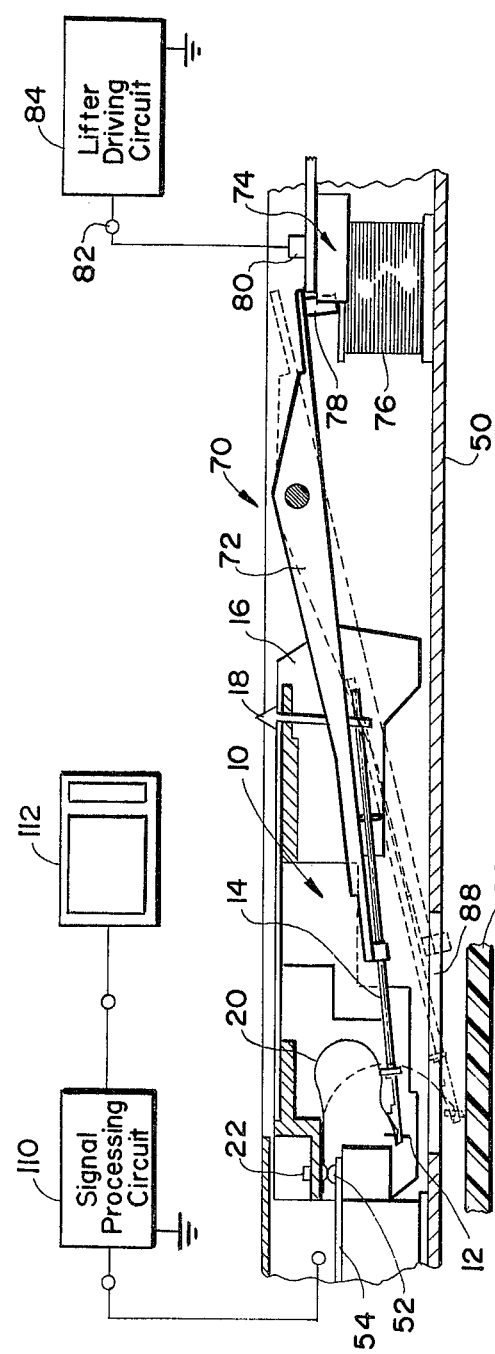
FIG. 3 depicts a video disc player in which the carriage of FIG. 2 is translatably mounted.

The cartridge 10 is installed in a carriage 50 shown in FIGS. 2 and 3. Upon installation, the cartridge terminal 22 contacts a terminal 52 of pickup circuits 54. When the carriage lid 56 is closed, a pair of depending tabs 58 and 60 disposed thereon defeat the cartridge retaining fingers 26 and 28 to release the stylus arm 14. The carriage 50 is fitted with a wire hoop 62 to lock the lid 56 shut. A leaf spring 64, attached to the underside of the lid 56, firmly seats the cartridge 10 in the carriage 50 upon closure.

Housed in the carriage 50 is the subject stylus lifter mechanism 70 comprising a pivotally-mounted, stylus arm support bracket 72, and a selectively-actuated electromagnet 74. The stylus arm 14 rests on the lifter support bracket 72 as the cartridge retaining fingers 26 and 28 are spread apart upon insertion of the cartridge 10 in the carriage 50. The lifter electromagnet 74 includes an electrical winding 76 forming a central volume defining an air-gap, and a permanent magnet 78 attached to the stylus arm support bracket, and having a portion thereof projecting into the central volume of the electrical winding. The lifter electrical winding 76 is equipped with a terminal 80 which is connected to the terminal 82 of a lifter driving circuit 84 of this invention. The other end of the electrical winding 76 is connected to the ground potential. When the lifter electrical winding 76 is energized, the permanent magnet 78 is repelled out of the central volume of the winding to gently lower the stylus 12 onto a rotating, turntable-supported disc 86 through an opening 88 in the bottom wall of the carriage housing 50. During playback, the carriage 50 follows the radially inward motion of the groove-guided stylus 12. When the voltage across the lifter winding 76 is reduced, the stylus arm support bracket 72 swings back up under the influence of gravity to raise the stylus 12.

The subject lifter driver circuit 84 will now be described in conjunction with FIGS. 4 and 5. To lower the stylus 12, a transistor 90 in a player control microprocessor 92 is turned off to enable the voltage (V1) at its output terminal 94 to rise as shown in FIG. 5-a. A capacitor 96 starts charging through a pair of resistors 98 and 100 towards a +5 volt source with a time constant of about 6 seconds as illustrated in FIG. 5-b. An amplifier 102 amplifies the voltage at its input terminal 104, and applies it to the lifter solenoid 76. This causes a gradually increasing current to flow through the electrical winding 76 to gently lower the stylus 12 onto a turntable-disposed record 86.

When the stylus 12 contacts the record 86, the pickup circuits 54, coupled to the stylus electrode 24, start recovering the prerecorded signals from the record. U.S. Pat. No. 4,080,625 (Kawamot, et al.) describes illustrative pickup circuits of this type. The recovered signals are then processed by the player signal processing circuits 110 to convert them into a form suitable for application to a conventional television receiver 112. Reference may be made to U.S. Pat. No. 4,097,899 (Yu) for an explanation of the player signal processing circuitry suitable for use with this invention. The signal processing circuits 110 include a video demodulator 114 for developing at its output terminal the picture signal information including luminance, chrominance and synchronizing components. The picture demodulator 114 includes a flip-flop circuit 116 which is set when the video carrier is detected at its input terminal 118 as indicated in FIG. 5-c. When this happens, the output terminal 120 of the flip-flop 116 is pulled up (V5) as shown at point T2 in FIG. 5-d. When the output terminal 118 goes high, the video is unsquelched, and the capacitor 96 begins to charge towards the +5 volt supply through a different set of resistors 98 and 122 with a faster time constant (i.e., approximately 115 milliseconds) as can be seen in FIG. 5-b. The voltage V2 across the capacitor 96 is amplified and fed to the lifter solenoid 76 to cause the lifter bracket 72 to quickly move away from the stylus arm 14. The rapid movement of the stylus arm support bracket 72 upon establishment of the stylus/disc contact reduces the tendency of the stylus 12 to bounce up and down and damage the disc. The point T3 in FIG. 5-b corresponds to the fully-lowered position of the lifter bracket 72, which is indicated in phantom in FIG. 3.

To raise the stylus 12, the transistor 90 of the player control microprocessor 92 is turned on to pull the output terminal 94 to the ground potential as shown at a point T4 in FIG. 5-a. The capacitor 96 immediately commences to discharge with a time constant of about 49 milliseconds through the resistor 98 as indicated in FIG. 5-b. At this time, the current through the solenoid 76 decreases, and the stylus 12 is lifted up. The low voltage at the microprocessor output terminal 94 pulls down the squelch line ($\overline{SQ}$) of the video demodulator 114 through a diode 124 to squelch the video output as indicated at the point T4 in FIG. 5-d. The point T5 in FIG. 5-c indicates the point at which the stylus 12 leaves the turntable-supported record 86.

The lifter driving circuitry 84 is not only simple and inexpensive, but it causes the pickup stylus to move gradually toward a turntable-mounted record until the stylus/record engagement is established. Upon the establishment of the stylus/record contact, the stylus arm support bracket is rapidly moved away from the stylus arm to reduce the possibility of disc damage.

TABLE OF VALUES

Illustratively, the values of the various elements utilized in FIG. 4 are set forth below.
RESISTORS—
98—1.5 kiloohms
100—180 kiloohms
122—2 kiloohms
CAPACITOR—
96—33 microfarads

What is claimed is:

1. In a disc player for recovering prerecorded signals from a disc record by means of pickup stylus; said stylus being disposed at one end of a stylus arm having its other end supported in a carriage; said player having a stylus arm lifting/lowering mechanism comprising a movable stylus arm support member and a selectivelyactivated, support member actuating means; said actuating means, when energized, causing said stylus arm support bracket to move toward said record to establish stylus/record engagement; lifter driving means comprising:
 (A) first means coupled to said actuating means for energizing said actuating means at a lower rate to gently move said stylus toward said record; and
 (B) second means coupled to said actuating means for energizing said actuating means at a higher rate when said stylus/record engagement is detected to cause said stylus arm support bracket to rapidly clear said stylus arm.

2. The lifter driving means defined in claim 1 additionally including means, coupled to said second energizing means, for detecting the onset of said prerecorded signals at the output of said stylus upon establishment of said stylus/record engagement; said detecting means enabling said second means to cause said stylus arm support bracket to rapidly clear said stylus arm upon occurrence of said prerecorded signals at said stylus output.

3. The lifter driving means of claim 2 wherein said detecting means comprises a video demodulator circuit.

4. The lifter driving means as outlined in claim 3 wherein said detecting means comprises a flip-flop device in said video demodulator circuit.

5. The lifter driving means set forth in claim 2 further including a control means, coupled to said first and second energizing means, for selectively disabling said actuating means to allow said stylus to move away from said record.

6. The lifter driving means as outlined in claim 5 wherein said control means comprises a control microprocessor.

7. The lifter driving means as outlined in claim 1 for use with said stylus lifting/lowering mechanism wherein said actuating means comprises a solenoid comprising an electrical winding and a magnetic element attached to said stylus arm support bracket.

8. The lifter driving means as defined in claim 1 wherein said first energizing means includes a first R-C circuit having a slower time constant.

9. The lifter driving means as defined in claim 1 wherein said second energizing means comprises a second R-C circuit having a faster time constant.

10. In a disc player for recovering prerecorded signals from a disc record by means of pickup stylus; said stylus being disposed at one end of a stylus arm having its other end supported in a carriage; said player having a stylus arm lifting/lowering mechanism comprising a movable stylus arm support member and a selectively-activated, support member actuating means; said actuating means, when energized, causing said stylus arm support bracket to move toward said record to establish stylus/record engagement; lifter driving means comprising:

(A) first and second means for energizing said actuating means at a lower and a higher rate respectively;

(B) means for selectively enabling the operation of said first and second energizing means to initiate lowering of said stylus; and (C) means for delaying the operation of said second energizing means until the presence of said signals is detected at the output of said stylus.

11. The lifter driving means of claim 10 wherein said delaying means comprises a video demodulator circuit.

12. The lifter driving means as outlined in claim 11 wherein said delaying means comprises a flip-flop device in said video demodulator circuit.

13. The lifter driving means as defined in claim 10 wherein said selectively enabling means also serves to disable said first and second energizing means.

14. The lifter driving means as outlined in claim 13 wherein said control means comprises a control microprocessor.

15. The lifter driving means as outlined in claim 10 for use with said stylus lifting/lowering mechanism wherein said actuating means comprises an electromagnet comprising an electrical winding and a magnetic element attached to said stylus arm support bracket.

16. The lifter driving means as defined in claim 10 wherein said first energizing means includes a first R-C circuit having a slower time constant.

17. The lifter driving means as defined in claim 10 wherein said second energizing means comprises a second R-C circuit having a faster time constant.

* * * * *